(12) United States Patent
Miller et al.

(10) Patent No.: US 8,380,460 B2
(45) Date of Patent: Feb. 19, 2013

(54) METHOD AND SYSTEM FOR DISTINGUISHING POSITIONS OF TIRES IN A DUAL REAR TIRE VEHICLE

(75) Inventors: Thomas Lee Miller, Ann Arbor, MI (US); Greg Swadling, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 271 days.

(21) Appl. No.: 12/843,006

(22) Filed: Jul. 24, 2010

(65) Prior Publication Data

US 2012/0022801 A1 Jan. 26, 2012

(51) Int. Cl.
*B60C 23/02* (2006.01)
(52) U.S. Cl. .......................... 702/150; 340/442; 340/447
(58) Field of Classification Search .................. 702/150; 340/442, 447
See application file for complete search history.

(56) References Cited

U.S. PATENT DOCUMENTS

| | | | |
|---|---|---|---|
| 6,799,129 B2 * | 9/2004 | Schmidt et al. ................. | 702/73 |
| 6,952,160 B1 * | 10/2005 | Bennie et al. ................. | 340/442 |
| 7,737,835 B2 * | 6/2010 | Kyllmann et al. ............ | 340/442 |
| 2002/0039066 A1 * | 4/2002 | Fuller et al. ................... | 340/442 |
| 2003/0001735 A1 * | 1/2003 | Honeck et al. ................ | 340/445 |
| 2003/0048178 A1 * | 3/2003 | Bonardi et al. ............... | 340/442 |
| 2004/0255663 A1 * | 12/2004 | Porter et al. .................... | 73/146 |
| 2009/0084174 A1 * | 4/2009 | Gila et al. .................... | 73/146.5 |
| 2010/0214088 A1 * | 8/2010 | Lange et al. .................. | 340/447 |

* cited by examiner

*Primary Examiner* — Janet Suglo
(74) *Attorney, Agent, or Firm* — Joseph E. Root

(57) ABSTRACT

A method for identifying tire positions of a dual rear tire vehicle having front tires and a pair of dual rear tires. The dual rear tires include an inner rear tire and an outer rear tire. The method includes providing a set of tire monitoring modules attached to each of the tires, and a processing module operatively attached to the tire monitoring modules. Further, the method includes receiving tire information, including tire pressure signals and rotational direction, from the set of monitoring modules of each of the tires. The method then involves identifying the dual rear tires and the front tires, and the dual rear tires located on right side and left side of the vehicle based on the received tire information. The inner rear tire and the outer rear tire of each of the dual rear tires are also identified based on the received tire information.

8 Claims, 4 Drawing Sheets

| Vehicle side | Rotation | Position |
|---|---|---|
| Left | 1 | Left Rear Outer |
| Left | 0 | Left Rear Inner |
| Right | 1 | Right Rear Inner |
| Right | 0 | Right Rear Outer |

FIG. 4

METHOD AND SYSTEM FOR DISTINGUISHING POSITIONS OF TIRES IN A DUAL REAR TIRE VEHICLE

BACKGROUND

This application relates generally to the field of vehicle suspensions, and more particularly, to monitoring and adjusting tire pressure of a vehicle.

Dual rear tire vehicles such as super duty dually trucks or trailers experience extremely variable loads. At times, the vehicle may be operated without any load at all, while at other times the load may include cargo or passengers, in varying amount or number. Owing to the distribution of load dictated by vehicle design, the load carried by rear axle tends to be greater than the load carried by front axle. Thus, rear tires, having inner and outer tires, generally require higher pressures than front tires for optimal operation with the load. Manufacturers typically provide placards, attached to the vehicle, depicting optimal tire pressure values under varying load conditions. The placards recommend a lower front tire pressure than the rear tire pressure under maximum load conditions. In addition, two pressure levels will be recommended for the rear tires, a lower pressure for comfort and handling under lighter load conditions, and a higher pressure to accommodate heavier loads. This system is generally referred to as a "dual placard" or "split placard" system.

The dual rear tire vehicle requires a Tire Pressure Monitoring System (TPMS) to warn a vehicle operator if the tire pressures of each of the front and rear tires are below a predetermined threshold value. The TPMS may be a remote tire pressure monitoring system including remote tire pressure sensors, monitoring absolute tire pressures, and a centralized receiver. The individual tire pressures are communicated to the central receiver via radio frequency transmitters, which alerts the vehicle operator whether the pressure is below a predetermined limit. The alert may be in form of an alarm or in form of a display on a touch screen. In some systems, the alert can be generic and simply inform the vehicle operator that at least one of the tires has low pressure. Alternatively, the alert can specifically indicate the running tire having low pressure.

Typically, the rear tires have a different predetermined threshold value relative to the front tires. To ensure that correct tire pressures are communicated to the central receiver, the TPMS needs to differentiate between the front and dual rear tire locations. Further, a differentiation between inner rear tire and outer rear tires is required. Accordingly, appropriate identification of the tire locations becomes critical. For the appropriate identification, each tire pressure sensors include an associated unique identification code. Using such identification, the receiver associates each tire pressure with a particular tire location. In the event of a routine maintenance procedure or a repair procedure, however, when the tires are removed from the vehicle and placed back, the tire positions could change from front to rear or vise versa. This may result in communication of incorrect tire positions to the receiver.

To rectify the problem mentioned above, there are manual processes that can be used to calibrate the TPMS with the proper position of each tire. It should be apparent, however, that manual calibration processes may be subjected to human error. As a result, the manual process may lead to incorrect recognition of tire locations. In addition, the existing TPMS may not be capable of differentiating between the inner and outer rear tires of the dual rear tire vehicle.

It is evident that there remains a need for efficiently identifying position of each tire of a dual rear tire vehicle in order to maintain tire pressures within recommended ranges.

SUMMARY

One embodiment of the present disclosure describes a method for identifying tire positions of a dual rear tire vehicle having front tires and a pair of dual rear tires. The dual rear tires include an inner rear tire and an outer rear tire. The method includes providing a set of tire monitoring modules attached to each of the tires, and a processing module operatively associated with the tire monitoring modules. Further, the method includes receiving tire information from the set of monitoring modules, including tire pressure signals and rotational direction data, of each of the tires. The method then involves identifying the dual rear tires and the front tires, and the dual rear tires located on right side and left side of the vehicle based on the received tire information. The inner rear tire and the outer rear tire of each of the dual rear tires are also identified based on the received tire information.

The present disclosure also describes a system for identifying tire position of a dual rear tire vehicle having front tires and a pair of dual rear tires. The dual rear tires include an inner tire and an outer tire. The system includes a set of monitoring modules and a processing module operatively associated with the monitoring modules. The monitoring modules include a pair of front monitoring modules attached to the front tires to transmit tire information of the front tires, and a set of rear monitoring modules attached to the pair of dual rear tires to transmit tire information of the dual rear tires. The tire information includes tire pressure signals and rotational direction data. Further, the processing module identifies the dual rear tires and the front tires, and the dual rear tires located on right side and left side of the vehicle based on the tire pressure signals. The processing module also identifies an inner rear tire and an outer rear tire of the each of the dual rear tires based on the rotational direction.

BRIEF DESCRIPTION OF THE DRAWINGS

The drawing figures described below set out and illustrate a number of exemplary embodiments of the disclosure. Throughout the drawings, like reference numerals refer to identical or functionally similar elements. The drawings are illustrative in nature and are not drawn to scale.

FIG. 4 is another exemplary table describing how tire information of each tire of a vehicle can be utilized for identifying each tire of dual rear tires.

DETAILED DESCRIPTION

The following detailed description is made with reference to the figures. Exemplary embodiments are described to illustrate the subject matter of the disclosure, not to limit its scope, which is defined by the appended claims.

Overview

In general, the present disclosure describes a method and system for identifying the position of tires of a dual rear tire vehicle. The method and system described in this disclosure are generally applicable to any dual rear tire vehicle, such as super duty dually trucks, or trailers, that include a pair of front tires and a pair of dual rear tires. The system of the present disclosure is capable of identifying the front tires and the dual rear tires based on the respective tire pressures. The system is also capable of identifying position of the dual rear tires positioned on the right and left sides of the vehicle. In addition, the system identifies the position of the left rear inner tire and left rear outer tire; and right inner rear tire and right outer rear tire. Accordingly, a distinction can be made between the front tires and the dual rear tires; dual rear tires on the right side and left side of the vehicle; and inner rear tire and outer rear tire of each of the dual rear tires. Combination of the system or method of the present disclosure with a conventional Tire Pressure Monitor System (TPMS) results in effective monitoring and adjustment of the tire pressures of the dual rear tire vehicle.

Exemplary Embodiments

Figure 1:
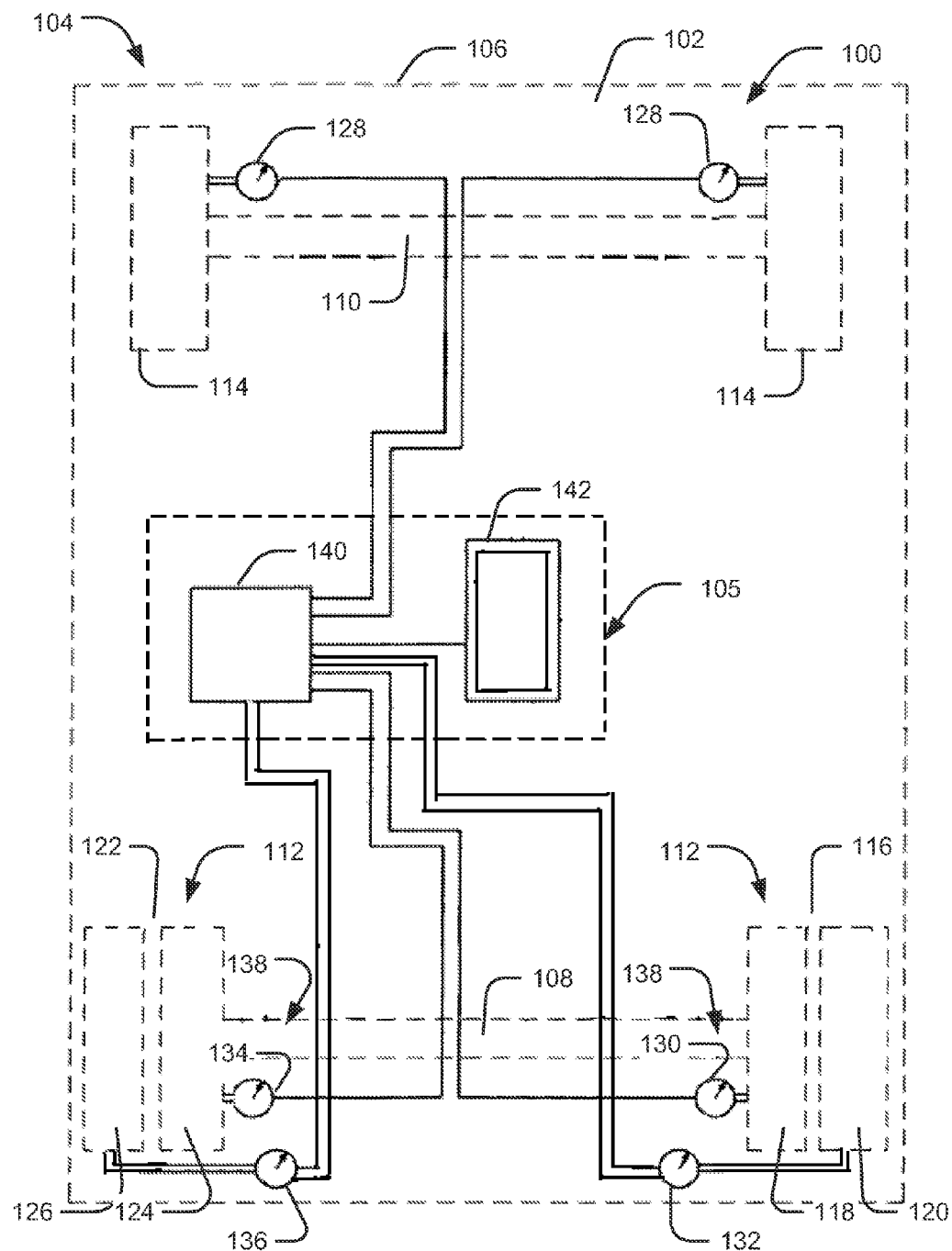
FIG. 1 illustrates a vehicle suspension system embodying a system of the present disclosure.

FIG. 1 illustrates a system 100 of the present disclosure embodied in a vehicle suspension system 102 of a dual rear tire vehicle 104. The vehicle suspension system 102 includes a Tire Pressure Monitoring System (TPMS) 105 configured therein. The vehicle 104 includes a vehicle body 106 supported on a rear axle 108 and a front axle 110, a pair of dual rear tires 112 and front tires 114. The vehicle suspension system 102 is connected between the vehicle body 106, the rear axle 108, the front axle 110, the dual rear tires 112, and the front tires 114. The dual rear tires 112 include right dual rear tires 116 having a right inner rear tire 118 and a right outer rear tire 120, and left dual rear tires 122 having a left inner rear tire 124 and a left outer rear tire 126.

The system 100 includes a set of monitoring modules, such as a pair of front monitoring modules 128 operatively attached to the front tires 114. Further, the system 100 includes a set of rear monitoring modules, such as a first rear monitoring module 130, a second rear monitoring module 132, a third rear monitoring module 134, and a fourth rear monitoring module 136, connected to the dual rear tires 112. For purposes of the description, the rear monitoring modules 130-134 will be collectively referred to as rear monitoring modules 138. The first rear monitoring module 130 and the second rear monitoring module 132 are attached to the right inner rear tire 118 and the right outer rear tire 120, respectively. Similarly, the third rear monitoring module 134 and the fourth rear monitoring module 136 are attached to the left inner rear tire 124 and the left outer rear tire 126, respectively. Each of the front monitoring modules 128 and the rear monitoring modules 138 transmit tire information. The tire information includes tire pressure signals and rotational direction data associated with each of the front tires 114 and the dual rear tires 112. In an embodiment of the present disclosure, the system 100 may include separate modules to transmit the tire pressure signals and rotational direction data. Specifically, radio frequency (RF) detectors may be used to transmit the pressure signals, and tire sensors known in the art may be utilized to transmit the rotational direction data.

The system 100 also includes a processing module 140 for processing the tire information, operatively associated with the front and rear monitoring modules 128 and 138 in any suitable manner known in the art. For example, the monitoring modules 128 and 138 may be in direct electrical communication with the processing module 140, through leads, conductors, and the like; or the monitoring modules 128 and 138 may communicate with the processing module 140 through wireless connection.

The processing module 140 receives the pressure signals, included in the tire information, either as digital values or as analog values. Along with the pressure signals, the processing module 140 may also receive inflation pressure values of the front tires 114 and the dual rear tires 112. The processing module 140 may be configured to process the signals initially through an analog to digital conversion unit, or to employ analog signals directly. The processing module 140 also receives the rotational direction, included in the tire information, in form of integer or other type of values.

The system 100 also includes an interface module 142 responsive to the processing module 140 to alert a vehicle operator of the tire pressure values of the vehicle 104. The interface module 142 may also provide a display or notification of relative mounting positions of the vehicle tires. The interface module 142 can be a touch screen, an LED display, or other known interface modules known in the art. The method implemented to identify the positions of the front tires 114 and the dual rear tires 112 is explained in detail in FIG. 2.

Figure 2:
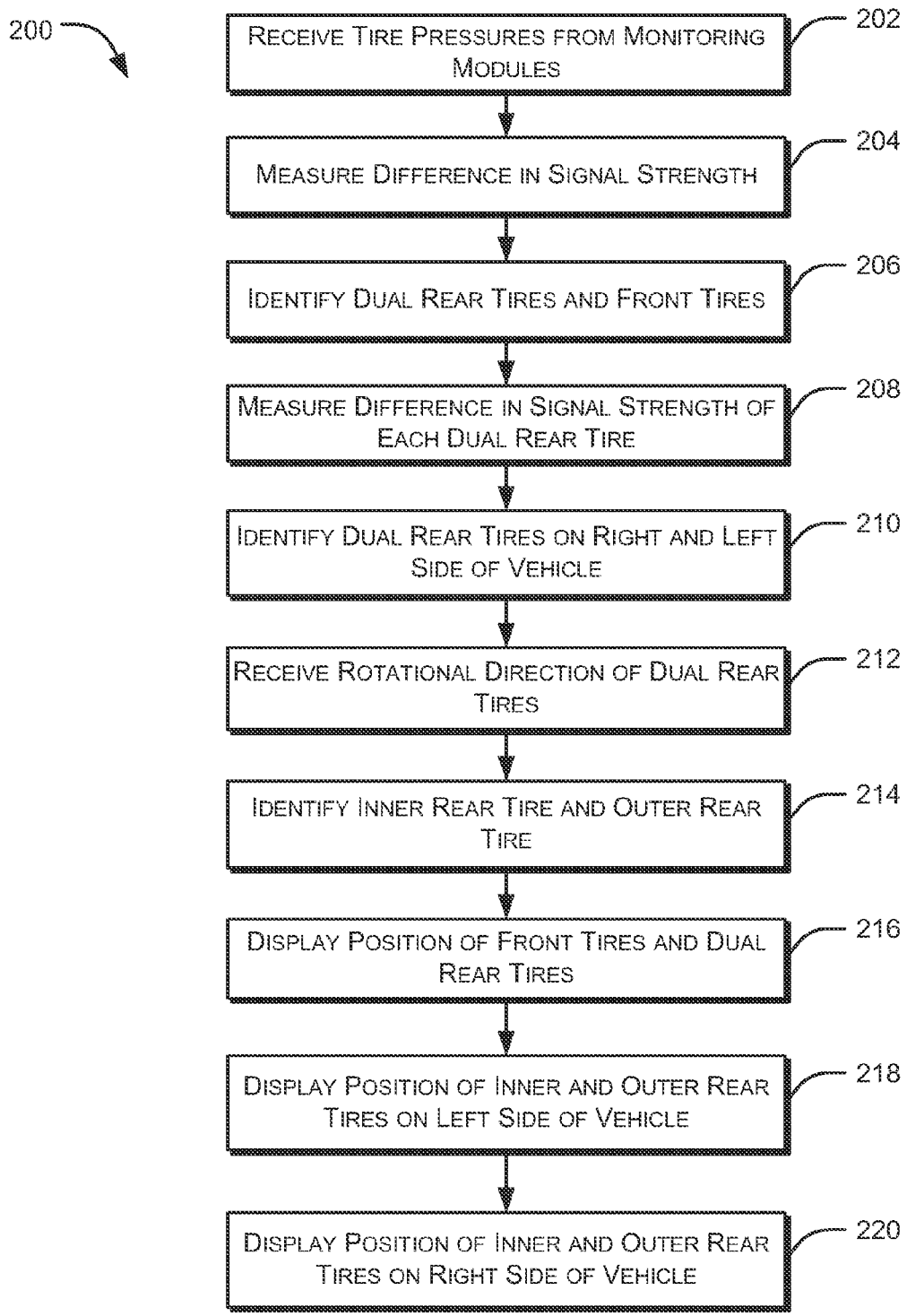
FIG. 2 is a flow chart illustrating an embodiment of a method of the present disclosure.

FIG. 2 illustrates a method 200, employed in the system 100, for carrying out the subject matter of the present disclosure. The method 200 starts at step 202, where, the processing module 140 receives the tire information from the front and rear monitoring modules 128 and 138. It should be apparent that the pressure signals, included in the tire information, transmitted from the monitoring modules attached to the front tires 114 are higher in strength than the monitoring modules attached to the dual rear tires 112. At step 204, the processing module 140 measures the difference in the strengths of the received pressure signals to identify if the tire information is received from the front monitoring modules 128 or the rear monitoring modules 138. Accordingly, the processing module 140 distinguishes between the dual rear tires 112 and the front tires 114, at step 206.

Upon identification of the dual rear tires 112 and the front tires 114, at step 208 the processing module 140 measures the difference in pressure signal strengths, included in the tire information, received from the monitoring modules attached to the right and left side tires of the vehicle 104. It is apparent that the signals received from the monitoring modules associated with the right dual rear tires 116 are stronger than the monitoring modules associated with the left dual rear tires 122. These signals are utilized by the processing module 140 to identify whether the tire information is received from the right dual rear tires 116 or the left dual rear tires 122 to distinguish between the dual rear tires positioned on the right side and left side of the vehicle 104, at step 210. It will be apparent that the processing module 140 may identify the right dual rear tires 116 and left dual rear tires 122 before the step of identifying the front tires 114 and the dual rear tires 112.

Along with the pressure signals, the processing module 140 receives rotational direction data, included in the tire information, of each of the dual rear tires 112, at step 212. It is apparent that wheel assemblies including the inner and outer rear tires and rims of a conventional dual rear tire vehicle rotate in opposite angular directions, since the dual rear tires are facing each other. Accordingly, the right and left outer rear tires 120 and 126 rotate in one direction, and the right and left inner rear tires 118 and 124 rotate in opposite angular direction.

Using the rotational direction data, the processing module 140 determines at step 214, if the tire information is transmitted from the monitoring modules attached to the right and left inner rear tires 118 and 124 or the monitoring modules attached to the right and left outer rear tires 120 and 126. Accordingly, the processing module 140 distinguishes between the inner and outer rear tires on right side and left side of the vehicle 104. Implementations of the method for identifying inner and outer rear tires are explained in detail in conjunction with FIGS. 3 and 4.

In an embodiment of the present disclosure, the processing module 140 may first utilize the rotational direction, included in the tire information, to identify the rear tires rotating in the same direction. Then, the pressure signals may be used to distinguish between inner and outer rear tires on the right and left side of the vehicle 104.

The processing module 140 sends the output to the interface module 142 for display thereof. At step 216, the interface module 142 outputs the pressure values corresponding to the positions of the dual rear tires 112 and the front tires 114 along with the positions of the right dual rear tires 116 and the left dual rear tires 122 at step 218. At step 220, the interface module 142 also outputs the positions of the inner rear tires 118, 124 and the outer rear tires 120, 126. The interface module 142 indicates the positions of the tires either as pictorial representation or in form of data. For example, the interface module 142 may display the vehicle suspension system 102 indicating the various tires with numeric values representing the tire pressure value of each of the tire. Alternatively, the interface module 142 may display a list of location of each of the tires and the corresponding pressure values.

Figure 3:
FIG. 3 is an exemplary table describing how rotational direction of dual rear tires of a vehicle can be utilized for identifying inner and outer rear tires of each of dual rear tires.

FIG. 3 illustrates a table 300 describing how rotational directions of the tires of a dual rear tire vehicle, such as the vehicle 104 can be used to differentiate between inner and outer rear tires. Upon identification of dual rear tires positioned on right side and left side of the vehicle, the rotational direction of each of the dual rear tires is utilized to identify the inner and outer rear tires of the dual rear tires. In the table 300, "1" represents rotation towards right and "0" represents rotation towards left. If a rear tire positioned on the left side rotates towards right (as represented by "1") then the tire is the outer rear tire, and if the rear tire rotates towards left (as represented by "0") then the tire is the inner rear tire.

For the dual rear tires positioned on the right side of the vehicle, a rear tire rotating towards right (as represented by "1") is the inner rear tire, and a rear tire rotating towards left (as represented by "0") is the outer rear tire.

Figure 4:
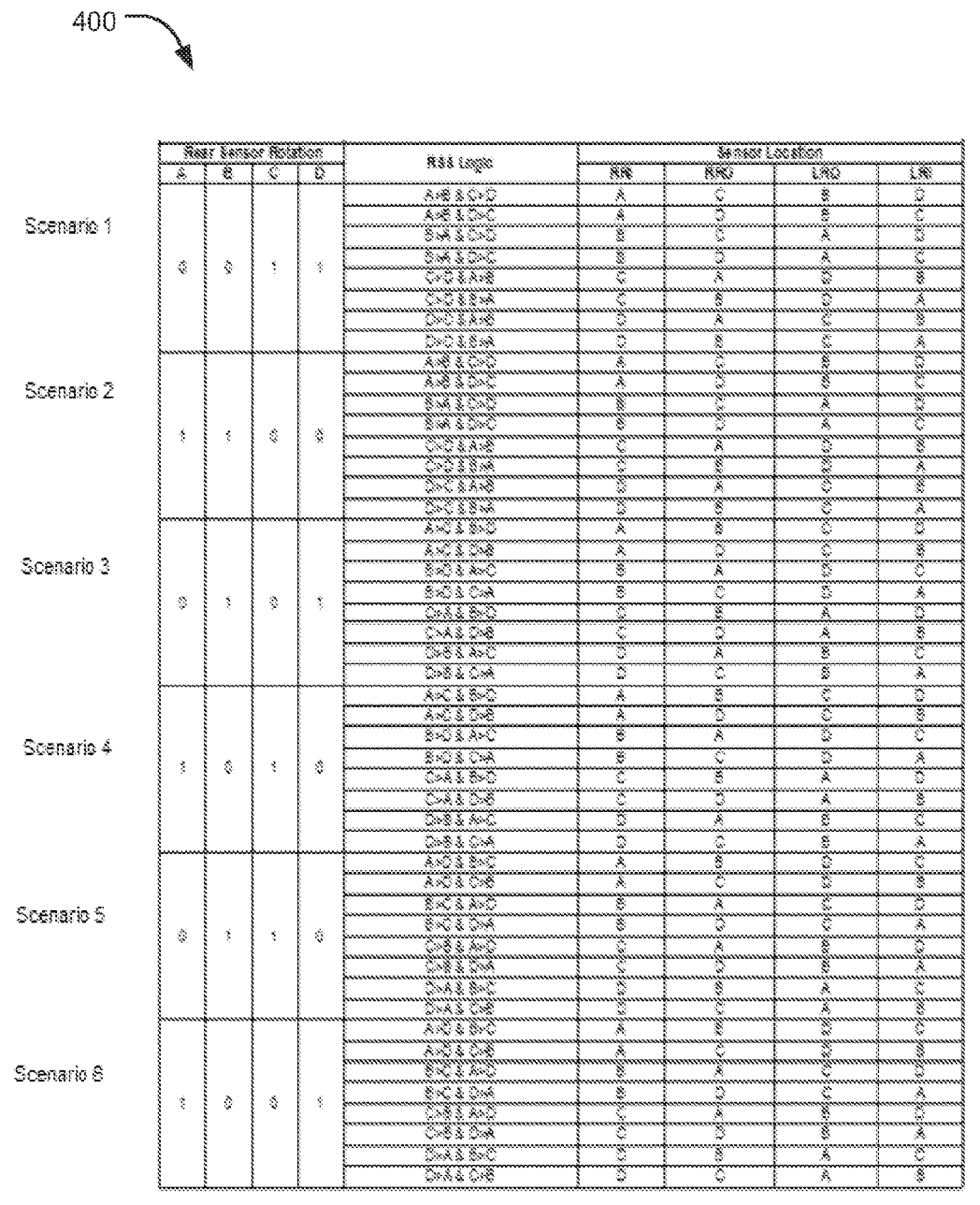

FIG. 4 illustrates a table 400 describing how the tire information, including pressure signals and rotational direction data, can be utilized to differentiate between tires of a dual rear tire vehicle, such as the vehicle 104. The differentiation can be divided into two steps. In the first step, the rotational direction data is used to identify the tires having same rotational direction. In the second step, received signal strength (RSS) of the pressure signals is utilized to distinguish positions of each of the dual rear tires having identical rotation direction. Using the first step to sort the tires based on the rotational direction, the number of RSS comparisons in the second step are reduced to 8 possible variations instead of conventional 24 variations, thereby improving the reliability of the system 100 of the present disclosure.

In the table 400, "0" indicates tire rotation towards left and "1" indicates rotation towards right. "A", "B", "C", and "D" refer to set of monitoring modules attached to each of the dual rear tires. The present disclosure may be implemented in six possible scenarios to identify the tire positions. In first scenario, rotational direction data is received from each of the set of monitoring modules and the rear tires having the same rotational directions are identified. If "0" value is received from the monitoring modules "A" and "B" then, the rear tires to which the monitoring modules "A" and "B" are attached rotate towards left direction. Further, if the monitoring modules "C" and "D" transmit value "1" then the rear tires corresponding to the monitoring modules "C" and "D" rotate towards right direction. Once the tires having same rotational direction have been identified, the pressure signals are used to determine the location of the rear tires.

As illustrated in the table 400, between the monitoring modules "A" and "B" attached to the rear tires having same rotational direction (towards left), if the pressure signal strength of "A" is greater than that of the "B", then "A" is attached to the right inner rear tire and "B" is attached to the right outer rear tire. Similarly, if the signal strength of "C" is greater than the signal strength of "D" ("C" and "D" attached to the rear tires having same rotational direction i.e. towards right) then "C" is attached to the left outer rear tire and "D" is attached to the left inner rear tire. Otherwise, if the signal of "D" is stronger than "C", then "D" is attached to the right outer rear tire while "C" is attached to the left inner rear tire.

Other variations wherein one of the two rear monitoring modules attached to the rear tires having the same rotational direction has stronger signal strength than the other are also possible. All such variations are illustrated in the table 400 and description herein is avoided thereof for the sake of brevity. In addition, other scenarios in which the method can be implemented are illustrated in detail in the table 4 and description herein is avoided thereof for the sake of brevity.

Those skilled in the art will understand that the steps set out in the discussion above may be combined or altered in specific adaptations of the disclosure. The illustrated steps are set out to explain the embodiment shown, and it should be anticipated that ongoing technological development will change the manner in which particular functions are performed. These depictions do not limit the scope of the disclosure, which is determined solely by reference to the appended claims.

CONCLUSION

The present disclosure provides a system, such as the system 100, and method, such as the method 200 for identifying tire positions of a dual rear tire vehicle embodying the following advantages. The system and method enable an easy identification of the positions of the dual rear tires of the vehicle. Moreover, present disclosure provides an efficient mechanism to identify the positions of the inner rear tires and the outer rear tires located on the right and left sides of the vehicle.

The specification has set out a number of specific exemplary embodiments, but those skilled in the art will understand that variations in these embodiments will naturally occur in the course of embodying the subject matter of the disclosure in specific implementations and environments. For example, some other detectors than the RF detectors may be used. It will further be understood that such variation and others as well, fall within the scope of the disclosure. Neither those possible variations nor the specific examples set above are set out to limit the scope of the disclosure. Rather, the scope of claimed invention is defined solely by the claims set out below.

What is claimed is:

1. A method for identifying tire positions of a dual rear tire vehicle having front tires and a pair of dual rear tires, the dual rear tires having an inner rear tire and an outer rear tire, the method comprising:

providing a set of tire monitoring modules coupled to each of the tires, and a processing module operatively coupled to the tire monitoring modules, the tire monitoring modules including a pair of front monitoring modules and a set of rear monitoring modules;

receiving tire information from the set of monitoring modules, the tire information including tire pressure signals and rotational direction data of each of the tires;

identifying the dual rear tires and the front tires based on the received tire information;

identifying the dual rear tires located on right side and left side of the vehicle based on the received tire information; and identifying the inner rear tire and the outer rear tire of each of the dual rear tires based on detecting opposite rotational directions of the inner rear tire and the outer rear tire.

2. The method of claim 1, wherein the step of identifying the dual rear tires and the front tires includes measuring difference in strengths of the tire pressure signals received from the rear and front monitoring modules.

3. The method of claim 1, wherein the step of identifying the dual rear tires located on the right side and left side of the vehicle includes measuring difference in strengths of the tire pressure signals received from each of the rear monitoring modules.

4. The method of claim 1, wherein the step of identifying the front tires and the dual rear tires is implemented by radio frequency detectors.

5. A system for identifying tire position of a dual rear tire vehicle having front tires and a pair of dual rear tires, the dual rear tires having an inner rear tire and an outer rear tire, the system comprising:

a set of monitoring modules comprising:

a pair of front monitoring modules coupled to the front tires, each of the front monitoring modules being configured to transmit tire information of the front tires, the tire information including tire pressure signals and rotational direction corresponding to the front tires; and a set of rear monitoring modules coupled to the pair of dual rear tires, the rear monitoring modules being configured to transmit tire information of each of the dual rear tires, the tire information including tire pressure signals and rotational direction corresponding to the dual rear tires; and a processing module operatively coupled to the set of monitoring modules, the processing module configured to:

identify the dual rear tires and the front tires based on the received tire pressure signals;

identify the dual rear tires located on right side and left side of the vehicle based on the received tire pressure signals; and identify an inner rear tire and an outer rear tire of the each of the dual rear tires based on the received rotational direction, and using the received rotational direction to identify opposite rotational directions of the inner rear tire and the outer rear tire.

6. The system of claim 5, wherein each of the set of monitoring modules includes a tire sensor and a radio frequency detector.

7. The system of claim 5, wherein the processing module is configured to identify the dual rear tires and the front tires by measuring difference in strengths of the tire pressure signals from the rear and front monitoring modules.

8. The system of claim 5, wherein the processing module is configured to identify the dual rear tires located on the right and left side of the vehicle by measuring difference in strengths of the received tire pressure signals from each of the rear monitoring modules.

* * * * *